United States Patent [19]

Long

[11] 4,051,291
[45] Sept. 27, 1977

[54] GYPSUM WALLBOARD

[75] Inventor: William J. Long, Chicago, Ill.

[73] Assignee: United States Gypsum Company, Chicago, Ill.

[21] Appl. No.: 491,097

[22] Filed: July 23, 1974

Related U.S. Application Data

[63] Continuation of Ser. No. 221,324, Jan. 27, 1972, abandoned.

[51] Int. Cl.² .......................... B32B 7/14; B32B 3/00
[52] U.S. Cl. .................................. 428/201; 428/211; 428/219; 428/304; 428/535; 428/536; 156/39; 156/44
[58] Field of Search ........................ 161/159, 266, 268; 156/39, 44; 428/201, 211, 219, 304, 533, 535, 536

[56] References Cited
U.S. PATENT DOCUMENTS

| | | | |
|---|---|---|---|
| 2,044,401 | 6/1936 | Roos | 154/2 |
| 3,189,511 | 6/1965 | White | 161/162 |
| 3,307,987 | 3/1967 | Bieri | 156/41 |
| 3,414,467 | 12/1968 | Ferrara | 161/266 |
| 3,463,685 | 8/1969 | Elsevier | 156/44 |
| 3,516,882 | 6/1970 | Cummisford | 156/39 |
| 3,690,981 | 9/1972 | DeFrank et al. | 161/137 |
| 3,691,003 | 9/1972 | Elischer | 161/159 |

OTHER PUBLICATIONS

Delmonte, "The Technology of Adhesives" Hafner Publ. Co., 1947, pp. 277-290.

Primary Examiner—William R. Dixon, Jr.
Attorney, Agent, or Firm—Samuel Kurlandsky; Robert H. Robinson; Kenneth E. Roberts

[57] ABSTRACT

A specially prepared paper bond liner, gypsum wallboard, and gypsum wallboard process which bonds the liner to the core by an adhesive confined to the paper-core interface, the adhesive comprising certain starches placed on the bond liner in their raw state.

6 Claims, 2 Drawing Figures

GYPSUM WALLBOARD

This is a continuation of application No. 221,324, filed Jan. 27, 1972, now abandoned.

BACKGROUND OF THE INVENTION

In the making of gypsum wallboard wherein a stucco slurry is cast between front and back paper cover sheets, and dried in a kiln to convert the hemihydrate stucco into a dihydrate gypsum core, it is important that certain bonding take place between the cover sheets and the core. Failure to achieve this produces paper "blows" during the kiln heating, or "peelers" after the heating wherein the cover sheets peel cleanly from the core without adhering to any of the gypsum.

Attempts to avoid the above problems have led to a fairly complex but unproven, mechanical bonding theory. For decades, the accepted theory concerning the bonding of the cover sheet to the core has been that the gypsum mechanically attaches the paper by becoming dissolved in the paper while still in the hemihydrate slurry state. The dissolved gypsum was thought to thereafter form dihydrate crystals interlocked with the dihydrate core. According to the mechanical bonding theory, the absorption of water by the paper decreases the ratio of water to unset gypsum in the very thin interlocking layer of the core adjacent to the paper sheet, causing a different crystal growth in this area of imbalance. As a result, no bond is realized if the board is dried too fast or at high temperatures. This loss of bond was said to be due to the fact that the very thin crystals which form the bond are readily calcined and so lose their bond to the paper. And, to prevent this "stratification" and resultant "delamination", the solution for years has been to add starch to the gypsum slurry as a water retention agent for the sole purpose of protecting the gypsum crystals. The theroy has been that the water holding properties of the starch will inhibit the calcination of the gypsum crystals at the area of water imbalance in and adjacent to the sheet and hence protect the mechanical bond of the gypsum crystals to the paper. See, e.g., U.S. Pat. No. 2,044,401 issued on June 16, 1963. Substantially all prior board process patents are based solely on the mechanical bond theory.

It will be recognized that for such starch to function for bonding purposes, it must migrate to the paper-core interface from the slurry forming the core. Such migration is dependent upon the board core density, the water-resistance (sizing) of the paper, and the board drying conditions which include time, temperature, and humidity. It is definitely dependent on the starch being migratory and for this reason the starch used has most commonly been cooked, pregelatinized starch or one which has been dextrinized—a well-known degradation step which increases the cost of the starch component. Each of the above migration factors is subject to considerable variance at a board plant with the result that the production of satisfactory paper-core bonding is very unpredictable. A further, and considerable, disadvantage is that starch migration of necessity requires that a large portion of the starch will be "wasted", i.e., left in the core. For example, as much as 16 pounds of migratory starch per thousand square feet of board may be necessary to achieve sufficient migration to give proper bond. The result is that a significant amount, namely at least 90% as I have discovered, of an already costly component is wasted, resulting in a board which is more expensive than is necessary. It is because of this cost that the early history of starch addition to boards concerned methods of producing a cheaper starch additive.

Further prior art attempts have been made to improve, increase, or direct, in one fashion or another, the starch migration from the core to the paper-core interface. Examples include the addition of pregelatinized starch to the slurry, or the addition of a raw starch to the slurry where it is modified in situ by enzymes. However, these prior attempts almost uniformly are characterized by the addition of the starch to the slurry.

A recent innovation has been to add a form of starch to the bond liner prior to the casting of the slurry thereon. However, heretofore this technique absolutely required the use of pregelatinized or precooked starch, and even the step of roughening the bond liner. An example of this is shown in U.S. Pat. No. 3,516,882. Disadvantages arise from this technique, but these appear to have been ignored perhaps due to the continued reference in the 3,516,882 Patent to the old dihydrate bond theory. A most important disadvantage is that precooked starch migrates from the interface where it is desired. Still further, paper coated with precooked starch cannot be rewound, and must therefore be prepared at the board plant rather than at a paper mill. A further disadvantage is that precooked starch interferes with the wet bonding of the paper to the core, which wet bonding is essential to the invention as described below. Because of the wet bond interference which results when using precooked starch, various techniques such as the above-mentioned liner abrasion must be used in addition to make the precooked starch work at all.

Thus, rather than attempt to patch up piecemeal the old approach, an entirely new concept is needed.

SUMMARY OF THE INVENTION

The invention concerns a process, precoated wallboard bond liners, and sheet-covered gypsum core wallboard produced thereby, wherein the cover sheet or liner is dry bonded to the core solely by means of an adhesive which permits wet bonding of the paper to the core. More specifically, it has been discovered that the paper cover sheets will securely adhere to the core by an adhesive only, and then only if wet bonding between the paper and core is obtained and maintained until the adhesive's cured properties provide the initiation of the dry bond. Thus, there is provided a process wherein a gypsum wallboard is cast in such a way as to produce a wet bond at the paper-core interface in an amount sufficient to provide at least a minimum amount of hydrogen bonding between the paper and the core, and thereafter is dried with an adhesive concentrated at the paper-core interface, which adhesive establishes a "dry" bond before the hydrogen bonding is completely destroyed. The result is an improved gypsum board having a set gypsum core securely bonded to the paper cover sheets, the improvement comprising adhesive disposed at discrete, spaced apart locations in the paper-core interface for adhesively securing the paper sheet to the core upon drying, the adhesive being characterized as one which permits wet bonding of the paper sheet to the core stucco prior to the drying thereof. Preferably, such adhesive is further characterized as being non-film forming.

Accordingly, it is an object of the invention to provide an improved paper-covered gypsum wallboard and process for making the same, wherein the bonding of the paper to the gypsum core is predictable and relatively unaffected by variances in the board-making process or components.

A further object of the invention is to provide such an improved wallboard and process which are substantially more economical due to the elimination of unnecessary amounts of the components.

A related object of the invention is to provide such an improved wallboard and manufacturing process wherein the bonding of the paper to the gypsum core is based solely upon an adhesive located only at the paper-core interface, which adhesive permits proper wet bonding of the paper sheet during the process.

Still another object is to provide such a process, and an improved cover sheet for gypsum wallboard, wherein the cover sheet is coated with an adhesive and which nevertheless is capable of being roll-wrapped and shipped to a board processing station.

Other objects and advantages will become apparent upon reference to the following detailed discussion.

DESCRIPTION OF THE PREFERRED EMBODIMENTS

Figure 1:
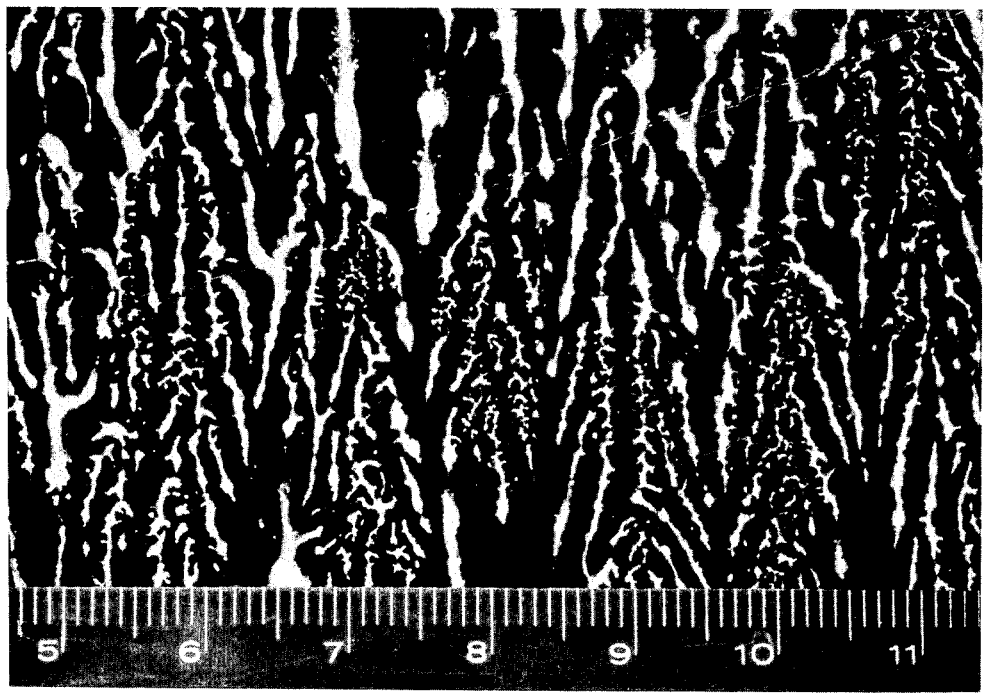
FIGS. 1 and 2 are photographs, enlarged 2.5 times, of a paper bond liner coated with starch by alternate methods of the invention, prior to casting the stucco slurry thereover.

The invention is based upon a completely new concept of paper-to-core bonding. As described above, all prior wallboard has been made by the theory that the wet and dry bond were one and the same and that the paper-to-core bond was mechanical and crystalline, and that the drying calcined and crystalline bond to the point that the bond was essentially destroyed. To prevent this, starch was usually introduced into the core slurry and caused to migrate to the paper-core interface to protect gypsum crystals forming the mechanical bond. In contrast, it is my discovery that the paper-to-core bond actually proceeds in a two-step fashion, as follows. When the slurry is cast onto the paper cover sheets, and specifically the bond liner thereof, wet or green bonding will occur between the bond liner and the slurry due to hydrogen bonding, unless the paper is treated to prevent such hydrogen bonding. For example, any bond liner sizing tends to reduce such hydrogen bonding, and any film completely coating the liner eliminates the hydrogen bonding altogether. Upon drying the board in conventional high temperature kilns, no matter how much wet bonding existed before, all of it is destroyed. Thus, for there to be any dry bond, a replacement for the destroyed hydrogen bonds must be found. Such a replacement is the adhesive of the invention. Since the dry bond is between the bond liner and the gypsum core, the adhesive must be maintained at the paper-core interface until it cures or sets.

Turning now to the details of the invention, generally speaking the adhesive must be coated upon the bond liner of the cover sheet in such a manner as to permit and maintain wet bonding of the cover sheet during the casting of the wallboard. Specifically, this means the adhesive must be non-film-forming until it cures, and be applied in a discontinuous manner such as to leave an amount of the bond liner surface uncoated. The adhesive must further be one which will not migrate from the paper-core interface during the casting and drying of the wallboard, and yet will set or cure during the drying before the wet bond has been completely destroyed. As used in this application, "set" or "cure" means the process by which the adhesive achieves its dry bonding strength. The board when dry will retain the adhesive in a discontinuous or spaced apart pattern at the core-to-sheet interface, because of the nonmigratory nature of the adhesive.

In accordance with one aspect of the invention, I have found that certain uncooked or raw starches and other adhesives meet the above set forth criteria admirably, and provide a wallboard paper-to-core bond which is uniformly free of "peelers" and paper "blows". As used in this application, unless otherwise stated, starch, raw or otherwise, includes starch derivatives and modified starch, as well as native starch. In the case of raw starch, the setting or curing of this adhesive occurs when the starch is cooked during the kiln drying until it is gelatinized and dried. The acceptable starches tend to have the following characteristics in common: a gelatinization during kiln drying, nonmigratory properties, cold-water insolubility, a significant amount of amylose, and perhaps some amylopectin. In contrast, starches which were not found to provide sufficient paper-to-core bond were precooked ore pregelatinized, or had no gelatinization during kiln drying, had enhanced migratory properties and/or an absence of a significant amount of amylose.

Figure 2:
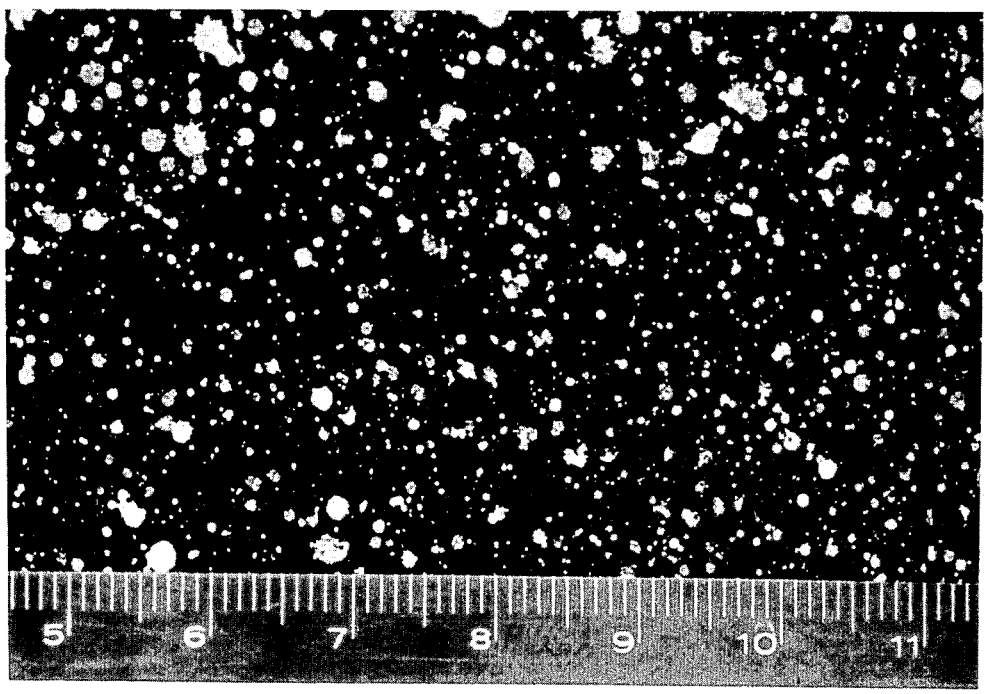

In accordance with another aspect of the invention, the adhesive which I have provided permits the paper to be coated well in advance of its use at the board plant, in contrast with previous techniques. Specifically, the adhesive of the invention, in view of its non-film-forming and tack-free characteristics, may be calendered or sprayed as a 10–40% solution onto the paper cover sheet at the paper mill and dried by the sheet's residual heat, and the paper sheet rewound and shipped to the board plant. At the board plant, it is unwound and the gypsum slurry is cast thereon in a conventional manner, the dried raw starch due to its nonmigratory nature staying at the paper-core interface until its sets in the drying kiln. Or, alternatively, the paper cover sheet can be coated with the raw starch by the same techniques but at the board plant, the slurry being cast upon the coating prior to its drying. In any case, the only qualification in the coating process is that substantial surface areas of the bond liner be left uncoated so as to permit adequate wet bonding. FIGS. 1 and 2 illustrate two types of discontinuous coating wherein substantial areas of the surface are left free to form the wet interface. FIG. 1, shown with a centimeter scale, illustrates so-called "turkey tracks" applied by dry-calendering at a paper mill. The very discrete, particulate nature of the uncooked starch itself creates this effect. FIG. 2, also shown with a centimeter scale, illustrates discontinuous and uniformly dispersed, incomplete coating obtained by spraying. Another satisfactory method is to apply the adhesive over a template. Regardless of the technique used, just how much this untreated area will be depends upon factors such as the roughness of the paper and the sizing. I have found that as a minimum there must be an amount of uncoated surface area such that after a Vicat set and prior to board drying, attempted separation of the cover sheet from the core will leave substantial fiber attachment to the core.

The result of coating the bond liner in the above manner with the adhesive of the invention is to permit initial wet bonding and to substitute the set or cured adhesive for the hydrogen bonds as the latter are destroyed during the kiln drying. Since kiln drying conventionally heats the slurry to a temperature between about 170° to 210° F, the adhesive of the invention must be and is nonmigratory in a wet state and stable at least up to these temperatures.

Turning now more specifically to the nonmigratory nature of the adhesive of the invention, and particularly the starch, the mechanism of the lack of migration is not completely understood. I have found that very little, if any, starch migration occurs away from the critical paper-core interface when raw, insoluble starches are cooked in situ at the paper-core interface. In contrast, excessive starch migration occurs into the sheet or away from the critical bond line when the same starch is cooked in situ in the gypsum slurry. It is self-evident that starch applied to the bond liner in the manner prescribed by the invention is gelatinized in the presence of vapor water or steam. In contrast, starches contained in the gypsum slurry are cooked or gelatinized in the presence of liquid water. Thus, it appears that the degree of starch migration is directly related to the availability and presence of liquid water during the gelatinization stage. In any event, to be acceptable, the starch must not migrate when applied wet to a bond liner and processed into gypsum board by heating up to at least 170° F, as that is the minimum temperature up to which the paper-core interface is heated in substantially all wallboard plant kilns.

EXAMPLES

The following examples have been set forth only to illustrate the invention, and are not an exhaustive list, unless otherwise stated. Starch solutions were prepared as follows as a 20% solution unless otherwise stated, in tap water maintained at a temperature at least 10° F below the gel point of the starch, percentages being in weight:

| Raw Starch | 20.00% |
|---|---|
| Preservative | 0.50 |
| (Dowicide "G" by Dow Company) Dispersion Agent | 0.05 |
| (Kelzan M by Kelco Company) Water | 79.45 |

This solution was coated onto the bond liner of normal sized gypsum board cylinder paper cover sheets by either a rubber-tipped draw-down board or an adhesive laminator. The coating was applied so as to give about 0.75 pounds of dry starch per MSF of paper bond liner. The sheets were air-dried overnight. A 100 to 100 water-stucco mix or slurry was prepared in a Lightnin mixer at 650 rpm for 150 seconds. The slurry was cast onto the precoated cover sheets in a metal mold so as to form a one-half inch board sample having both a front test cover sheet and a back cover, both of which were precoated with the starch slurry. The cast samples were dried by heating for 120 minutes in a kiln oven heated to the temperature indicated in the Table below, and thereafter air-dried 16 hours before testing for bond. Viscosities of the starch were measured by a Visco-Amylograph. Vicat sets were about 7 minutes in all cases and densities were about 52 lb./cu.ft. Board bond was measured by scoring the back cover sheet and core at the score line, and the two core sections peeled away from the front cover sheets. One hundred percent bond constitutes paper ply separation with all of the bond ply of the paper adhering to the core. Starch numbers were measured in a conventional manner by using the TAPPI - 419 standard iodine colormetric procedure. However, arbitrary numerical values were used in applying this test, namely 7 as the maximum amount of starch, and 0 representing no starch. The value of the starch number on the core represents the amount of starch retained at the interface, while the value on the exposed face of the paper cover sheet represents the amount of starch which migrated away from the interface.

The particular raw starches used are identified in the following table of results. It should be noted that the last two samples are controls and represent prior art pre-cooked starches.

TABLE I
RESULTS

| Sample # | Starch Description | | | Gel Temp. -F | Viscosities (Centipoises) | | Wet Bond | Kiln Oven Temp. (° F) | % Board Bond (dry) | Starch No. | |
|---|---|---|---|---|---|---|---|---|---|---|---|
| | Trade Name | Manufactured by | Type | | Temp. (° F)/ Maximum Viscosity | Viscosity at 203° F. | | | | Cn Core | On Face Paper |
| 1 | Tapioca | Geismar | Raw Tapioca Starch | 148° | 176°/230 | 160 | Yes | 320 | 100 | 7 | 0 |
| 2 | Penford Gum #300 | Penick & Ford | Raw Corn Starch Derivative | 139° | 150°/305 | 190 | Yes | 320 | 100 | 7 | 0 |
| 3 | Sta-Lok #400 | Staley | Raw Potato Starch Derivative | 135° | 147°/290 | 120 | Yes | 320 | 100 | 7 | 0 |
| 4 | Super Charge LV | Stein & Hall | Raw Modified Potato Starch | 131° | 143°/90 | 20 | Yes | 260 | 100 | 7 | 0 |
| 5 | Staley Tapioca | Staley | Raw Tapioca Starch | 151° | 160°/100 | 20 | Yes | 260 | 100 | 7 | 0 |
| 6 | Victor Starch | Staley | Raw Wheat Starch | 190° | 198°/20 | 20 | Yes | 320 | 100 | 7 | 0 |
| 7 | Essex Gum #1300 | Penick & Ford | Raw Ethylated Potato Starch | 131° | 154°/800 | 400 | Yes | 320 | 100 | 7 | 0 |
| 8 | Astro X-100 | Penick & Ford | Raw Cationic Potato Starch Derivative | 134° | 145°/220 | 50 | Yes | 320 | 100 | 7 | 0 |
| 9 | Douglas Pen-Sprae #3000 | Penick & Ford | Raw Modified Corn Starch | 143° | 167°/240 | 160 | Yes | 320 | 100 | 7 | 0 |
| 10 | 70% Amylose | Penick & Ford | Raw High Amylose Starch | Above 212° F | None | 0 | Yes | 260 or 320 | 0 | 7 | 0 |

TABLE I-continued

| | Starch Description | | | | Viscosities (Centipoises) | | | Kiln Oven | % Board | Starch No. | |
|---|---|---|---|---|---|---|---|---|---|---|---|
| Sample # | Trade Name | Manufactured by | Type | Gel Temp. -F | Temp. (° F)/ Maximum Viscosity | Viscosity at 203° F. | Wet Bond | Temp. (° F) | Bond (dry) | Cn Core | On Face Paper |
| 11 | PAF #3804 | Penick & Ford | Raw Cationic Double Derivative Corn Starch | 138° | 150°/70 | 5 | Yes | 320 | 100 | 7 | 0 |
| 12 | Sta-Thik | Staley | Raw Modified Migratory Corn Starch | 156° | 182°/200 | 200 | Yes | 320 | 0 1 | 7 | |
| 13 | Amioca American Pearl | Raw High Maize | 156° (100%) Amylopectin Starch | 164°/720 | 270 | | Yes | 320 | 0 | NA | NA (red starch) |
| 14 | 15% Solution of Hamco 267 | Staley | Precooked Corn Starch | NA | NA | NA | No | 320 | 0 | 0-1 | 7 |
| 15 | Staramic, Staley applied per Pat. No. 3, 516,882 | Pregelatinized Corn Starch | NA | NA | NA | NA | No | 320 | 0 | 0-1 | 7 |

The above table shows that successful samples producing 100% dry board bond can be made from a great variety of raw starches, provided they have certain characteristics. That is, as revealed by the starch number, the starch must remain at the paper-core interface, none having migrated through to the face of the paper (samples 1-11). In addition, there must be enough amylose to give a characteristic blue iodine test, as shown by the contrast of these samples with sample 13 which lacked the adhesive amylose fraction. Further, the board bond failure experienced with sample 10 indicates that the starch must gelatinize at temperatures to which the paper-core interface is subjected in the drying kiln. Such temperatures seldom exceed 210° F, and all but sample 10 in the first eleven samples had a gelatinization temperature below this figure.

In contrast, starches which failed to perform as adequate adhesives migrated away from the paper-core interface (samples 12, 14 and 15), did not gelatinize at the temperatures to which the interface is subjected in a drying kiln (sample 10), or interfered with wet bonding (control samples 14 and 15). The last of these clearly indicated that a starch will not adequately permit wet bonding, probably due to its film-forming characteristics. The lack of wet bonding in samples 14 and 15 resulted in the test paper lifting or "blowing" off the sample, and it was only through abnormal artificial attachment of the cover sheet to the core that migration was measured.

In addition to the above, for comparison purposes, still another test board was prepared as in the previous samples, wherein raw uncooked starch identical to sample 1 above was added, not as a coating to the bond liner, but to the slurry to ascertain its migratory nature under different conditions. As it was anticipated that migration would occur, 9 lbs. per MSF of ½ inch board was added, in contrast to the 1.5 pounds coated per MSF of board in the first 15 samples above. The kiln temperature was 320° F, and the sample showed good wet bond. However, the percentage of dry bond was 0, and the starch numbers were 1-2 on the core interface, and 7 on the face paper. Thus, not only did the tapioca starch migrate when placed in the slurry, it migrated almost exclusively to the face of the paper cover sheet.

This illustrates that the same starch, when found to be nonmigratory if processed according to the invention, may not be when added to the slurry per conventional practices. The failure of 9 pounds/MSF to produce dry bonding is simply an indication that higher amounts, perhaps even as much as 16 pounds, is required, when added to the slurry as per prior art methods.

The practical effect of the invention is to eliminate the starch which heretofore has been "wasted" in the core. That is, by means of the invention, starch need not and in fact is not added to the core slurry in any amount, nor does it migrate thereto or therefrom, as heretofore was the case. It is well known that large (usually between 12 and 16 pounds per MSF) amounts of starch, usually cooked, will produce good dry bonding if added to the slurry. Slight reductions are possible using sized sheets. This was confirmed by starch number measurements indicating migration to at least the paper-core interface from the interior of the core. In contrast, the invention described herein obtains dry bonding through the use of as little as 1 pound/MSF of board on sized or unsized paper - a drastic reduction resulting in considerable cost savings.

Mill Trial

At a paper mill a 25% uncooked, tapioca starch manufactured by Geismar was prepared, 0.05% Kelzan M being added to bring viscosity up to 2000 cps for discontinuous "turkey track" metering of the solution at the dry calender stack. The solution was added to regular gypsum board paper cover sheet at a rate providing an average starch pickup of about ½ pound of solids per MSF of paper. The paper was wound and shipped to a board plant, where they were made into one-half inch gypsum wallboard. The kiln drying cycle ranged from 300° to 700° F, lasting about 40 minutes. The entire run was free from "peelers".

Non-Starch Adhesives

A further adhesive which was found to be effective was polyvinyl alcohol. Specifically, a 20% solution of "Elvanol Polyvinyl Alcohol" Grade 71-24 manufactured by Du Pont was applied discontinuously to a bond liner sheet in an amount of 3.0 pounds of solids per MSF of board. Test samples were prepared as above. Satisfactory wet bond, and a 100% dry bond, were obtained. Although the iodine starch test could not be applied, the sample clearly evidenced a lack of migration of the adhesive.

Conclusion

Although the invention has been described in connection with certain preferred embodiments, it is not intended that it be limited thereto. For example, other root and grain starches other than those tested, such as raw sago, raw sorghum, and British gums can be used is modified, where necessary, to have the requisite properties such as lack of migration when wetted, after coating on a bond liner, and gelatinized. Thus, it is intended that the invention cover all embodiments, equivalents, and arrangements as may be included within the scope of the following claims.

What is claimed is:

1. In a panel comprising a rehydrated gypsum core securely bonded to a paper cover sheet by a starch adhesive disposed at the interface of said core and said cover sheet, the improvement wherein said starch adhesive is nonmigratory and is disposed at limited areas of said interface, the amount of starch present at said limited areas being sufficient to provide secure bonding of said paper cover sheet to said gypsum core when said starch adhesive has set, and wherein substantial areas of said interface are free of said starch adhesive, said free areas being sufficient to provide wet bonding of said cover sheet to said core prior to the setting of said starch adhesive, the portion of said paper cover sheet spaced from said interface being substantially free of starch.

2. An improved panel as defined in claim 1, wherein said starch is raw starch prior to heating to form said panel.

3. The improved panel as defined in claim 1, wherein said starch adhesive is present in an amount of at least about ½ pound per thousand square feet of paper cover sheet and is nonmigratory when applied to said cover sheet and processed to form a panel by heating up to at least about 170° F.

4. The improved panel as defined in claim 1, wherein said starch adhesive includes a starch having an amylose fraction sufficient in amount to give a blue iodine starch test.

5. The improved panel as defined in claim 4, wherein said starch is extracted from plants selected from the group consisting of tapioca, corn, potato, and wheat.

6. The improved panel as defined in claim 1, wherein said starch adhesive is further characterized as lacking a film thereover when applied to a cover sheet.

* * * * *